(12) United States Patent
Hara (10) Patent No.: US 8,103,419 B2
(45) Date of Patent: Jan. 24, 2012

(54) DRIVING FORCE TRANSMISSION DEVICE

(75) Inventor: Toshimi Hara, Takahama (JP)

(73) Assignee: JTEKT Corporation, Osaka-shi (JP)

( * ) Notice: Subject to any disclaimer, the term of this patent is extended or adjusted under 35 U.S.C. 154(b) by 585 days.

(21) Appl. No.: 12/247,331

(22) Filed: Oct. 8, 2008

(65) Prior Publication Data

US 2009/0099739 A1 Apr. 16, 2009

(30) Foreign Application Priority Data

Oct. 12, 2007 (JP) ................................. 2007-266185

(51) Int. Cl.
*F16D 27/108* (2006.01)
*G06F 19/00* (2006.01)

(52) U.S. Cl. ......................................... 701/69; 180/248
(58) Field of Classification Search ........................ None
See application file for complete search history.

(56) References Cited

U.S. PATENT DOCUMENTS

| | | | | |
|---|---|---|---|---|
| 6,745,885 B2 * | 6/2004 | Murakami et al. | ............ | 192/82 T |
| 6,808,037 B1 * | 10/2004 | Mueller | ........................ | 180/247 |
| 7,630,812 B2 * | 12/2009 | Jiang et al. | ........................ | 701/68 |
| 2007/0114089 A1 * | 5/2007 | Yoneda et al. | ................. | 180/249 |

FOREIGN PATENT DOCUMENTS

| | | |
|---|---|---|
| JP | 06-219177 | 8/1994 |
| JP | 2002-12049 | 1/2002 |
| JP | 2002-340053 | 11/2002 |

OTHER PUBLICATIONS

Japanese Office Action issued Oct. 25, 2011, in Japanese Application No. 2007-266185 (with English-language translation).

* cited by examiner

*Primary Examiner* — Michael J. Zanelli
(74) *Attorney, Agent, or Firm* — Oblon, Spivak, McClelland, Maier & Neustadt, L.L.P.

(57) ABSTRACT

A driving force transmission device includes a transfer torque command value calculation section which calculates a transfer torque command value indicating a command value of the transfer torque between two members based on a running state of the vehicle, an energy calculation section which calculates an energy value obtained by multiplying the transfer torque between the two members by a differential rotation rate between the two members at every predetermined sampling time, an energy accumulated value calculation section which calculates an energy accumulated value of accumulating the energy value calculated at every the predetermined sampling time, a map storage section which stores previously a map defining a relationship between the energy accumulated value and a correction torque, and a correction section which acquires the correction torque by applying the energy accumulated value to the map and corrects the transfer torque command value based on the acquired correction torque.

8 Claims, 5 Drawing Sheets

DRIVING FORCE TRANSMISSION DEVICE

BACKGROUND

The present invention relates to a driving force transmission device that distributes a driving force of an engine, for example, to the rear wheel side and controls the distribution.

A driving force transmission device transfers a torque between one drive shaft and the other drive shaft (hereinafter also referred to as "two members") by engagement of a multiple disk clutch disposed in a filled area of lubricating oil, as described in JP-A-2002-340053 (patent document 1). And an engagement force of the multiple disk clutch is adjusted by controlling an energizing current to an electromagnet.

In such driving force transmission device, even if the energizing current for the electromagnet is controlled based on the same transfer torque command value, the transfer torque between two members for transferring the driving force is changed due to a change with the passage of time. Thus, noting that the temperature characteristic of lubricating oil is varied due to a change with the passage of time, the optimal correction command value is calculated corresponding to a change with the passage of time by updating the transfer torque characteristic at the maintenance time, as described in patent document 1. The transfer torque command value can be corrected with the calculated correction command value to prevent influence due to a change with the passage of time.

Also, in consideration of a change in the clutch engagement force due to a change with the passage of time, the clutch engagement force is corrected so that an actual rotational speed difference between one drive shaft and the other drive shaft may be matched with the ideal rotational speed difference, as described in JP-A-2002-12049 (patent document 2).

[Patent document 1] JP-A-2002-340053
[Patent document 2] JP-A-2002-12049

SUMMARY

It is an object of the invention to provide a driving force transmission device for making the correction at higher precision than conventionally to prevent influence on the transfer torque between two members due to a change with the passage of time.

The present invention provides a driving force transmission device, provided between two members arranged to be relatively rotatable and transferring a rotation driving force of a drive source for a vehicle to a wheel, capable of controlling a transfer torque between the two members, the driving force transmission device comprising:

a transfer torque command value calculation section which calculates a transfer torque command value indicating a command value of the transfer torque between the two members based on a running state of the vehicle;

an energy calculation section which calculates an energy value obtained by multiplying the transfer torque between the two members by a differential rotation rate between the two members at every predetermined sampling time;

an energy accumulated value calculation section which calculates an energy accumulated value of accumulating the energy value calculated at every the predetermined sampling time;

a map storage section which stores previously a map defining a relationship between the energy accumulated value and a correction torque; and a correction section which acquires the correction torque by applying the energy accumulated value calculated by the energy accumulated value calculation section to the map and corrects the transfer torque command value calculated by the transfer torque command value calculation section based on the acquired correction torque.

With the driving force transmission device of the invention, the time term for the change with the passage of time is the energy accumulated value. That is, if the device continues to be used, the energy accumulated value increases. Herein, the relationship between the energy accumulated value and the transfer torque changes slightly at the outset of driving, and then greatly changes, for example, although it is different depending on the constitution of a multiple disk clutch. Further, as the energy accumulated value increases, the transfer torque is greater than at the initial time.

And in the driving force transmission device of the invention, the map stored in the map storage section is the map corresponding to the relationship between the transfer torque and the energy accumulated value as above. More specifically, the relationship between the energy accumulated value and the correction torque defined by the map is the relationship between the energy accumulated value and the inverse of the transfer torque.

In this way, with the driving force transmission device of the invention, the transfer torque command value is corrected based on a variation amount (correction torque) between the energy accumulated value and the transfer torque corresponding to the time term for the change with the passage of time, thereby preventing influence on the transfer torque between two members due to the change with the passage of time. In this invention, the differential rotation rate section a difference in the rotation rate per unit time between one drive shaft and the other drive shaft.

And the energy value calculated by the energy calculation section may be obtained by multiplying the transfer torque command value calculated by the transfer torque command value calculation section by the differential rotation rate between the two members. In this case, the differential rotation rate only may be measured to calculate the energy value. Accordingly, the energy value can be calculated very easily.

Also, the energy value calculated by the energy calculation section may be obtained by multiplying the actual transfer torque between the two members by the differential rotation rate between the two members. The more accurate energy value can be obtained by using the actual transfer torque. However, a torque sensor for measuring the actual transfer torque is required.

Also, the driving force transmission device may comprise an electromagnet capable of controlling the transfer torque between the two members based on a supplied current, in which the energy value calculated by the energy calculation section may be obtained by multiplying the transfer torque between the two members calculated based on the actual current supplied to the electromagnet by the differential rotation rate between the two members. In this case, since the actual transfer torque is not easily measured, the actual current supplied to the electromagnet is used instead. Generally, the current supplied to the electromagnet has a predetermined relationship with the transfer torque. Accordingly, it is possible to estimate the actual transfer torque based on the current supplied to the electromagnet. The relationship between the current supplied to the electromagnet and the transfer torque changes with the temperature. Thus, in consideration of the temperature, the transfer torque is calculated based on the current supplied to the electromagnet, whereby the transfer torque can be estimated at higher precision.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

First Embodiment

A driving force transmission device 1 of the present invention will be described below with reference to the drawings. Herein, an instance where the driving force transmission device 1 is applied to a traction force transfer for a four wheel drive vehicle is given below.

(1) Constitution of Four Wheel Drive Vehicle

First of all, the four wheel drive vehicle to which the driving force transmission device 1 of the invention is applied will be simply described below. The four wheel drive vehicle is the vehicle with a front wheel drive vehicle (FWD vehicle) as the basis, in which one pair of front axles are connected to a transaxle assembled on one side of an engine. Further, a propeller shaft 80 is connected to the transaxle. The propeller shaft 80 is connected via the driving force transmission device 1 to a drive pinion shaft 70. And the drive pinion shaft 70 is connected via a rear differential to one pair of rear axles.

That is, a driving force of the engine is transmitted via the front axle to the front wheel. On the other hand, if the propeller shaft 80 and the drive pinion shaft 70 are connected to be able to transfer the torque by the driving force transmission device 1, a driving force of the engine is transmitted from the drive pinion shaft 70 via the rear differential and each rear axle to the rear wheel.

(2) Constitution of Driving Force Transmission Device 1

Figure 1:
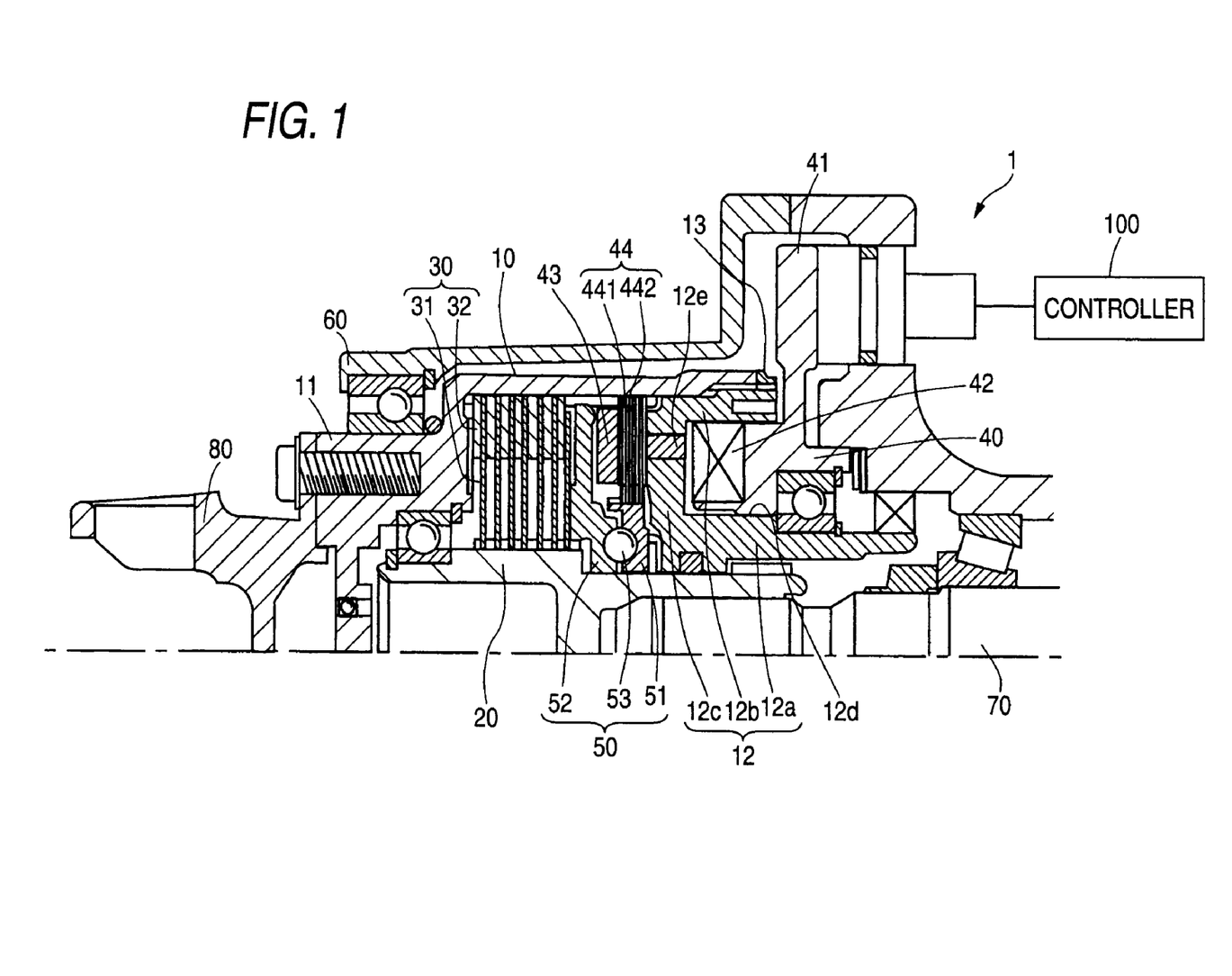
FIG. 1 is a cross-sectional view of the driving force transmission device 1, taken in the axial direction.

Referring to FIG. 1, the driving force transmission device 1 will be described below. FIG. 1 is a cross-sectional view of the driving force transmission device 1, taken in the axial direction.

The driving force transmission device 1 is accommodated within a differential carrier 60, and supported rotatably on the differential carrier 60. And it is supported via this differential carrier 60 on the vehicle body. This driving force transmission device 1 comprises an outside rotation member 10, an inside rotation member 20, a main clutch 30, a pilot clutch mechanism 40, and a cam mechanism 50. It is noted that the outside rotation member 10 and the inside rotation member 20 correspond to two members that can be relatively rotated and controls the transfer torque in the invention.

The outside rotation member 10 is formed of a housing 11, a rear cover 12 and a nut member 13. The housing 11 is made of a non-magnetic material or aluminum alloy. The spline is formed on the inner circumferential surface of the housing, except for an opening end portion. Further, an internal thread is formed around the opening end portion on the inner circumferential surface of the housing 11. And the opening side of the housing is directed to the rear of the vehicle (right side in FIG. 1). And the housing 11 is supported rotatably on the differential carrier 60 via a bearing disposed between the outer circumferential surface of the housing 11 and the inner circumferential surface of the differential carrier 60. Further, a plurality of bolt insertion holes are formed circumferentially outside in the bottom of the housing 11. And this housing 11 is connected to a rear end portion of the propeller shaft 80 by the bolts inserted into the bolt insertion holes. That is, a rotation of the propeller shaft 80 is directly transmitted to the outside rotation member 10.

The rear cover 12 is like an annulus formed with a through hole in the center axially. This rear cover 12 comprises an inner cylindrical portion 12a, an outer cylindrical portion 12b, and a disk portion 12 for connecting the front end of the inner cylindrical portion 12a and the front end of the outer cylindrical portion 12b. That is, the rear cover 12 forms an annular concave portion 12d in a part surrounded by the inner cylindrical portion 12a, the outer cylindrical portion 12b and the disk portion 12c. An external thread is formed on the outer circumferential surface of the outer cylindrical portion 12b. The external thread on the outer circumferential surface of the outer cylindrical portion 12b is screwed with the internal thread formed on the inner circumferential surface of the opening portion at the rear end of the housing 11 to cover the opening portion at the rear end of the housing 11. Further, an annular non-magnetic portion 12e made of stainless of non-magnetic material is embedded substantially in the diametrically center of the disk portion 12c of the rear cover 12. A part of the rear cover 12 except for the non-magnetic portion 12e is made of iron of magnetic material.

The nut member 13 is securely fastened with the external thread formed on the outer circumferential surface of the outer cylindrical portion 12b of the rear cover 12 so that its end surface may contact an opening end surface of the housing 11. That is, the nut member 13 is used to prevent looseness between the housing 11 and the rear cover 12 for positioning and fixing of both.

The inside rotation member 20 is like a shaft with the spline formed on the outer circumferential side centrally in the axial direction. This inside rotation member 20 passes through a through hole in the center of the rear cover 12 in fluid-tight manner, and is disposed inside the inner cylindrical portion 12a of the housing 11 and the rear cover 12. And the inside rotation member 20 is supported on the housing 11 and the inner cylindrical portion 12a of the rear cover 12 to be relatively rotatable with the outside rotation member 10, coaxially with the outside rotation member 10, in a state where it is restricted in the axial position with respect to the outside rotation member 10. Further, the rear end of the inside rotation member 20 is connected and fixed integrally with the front end of the drive pinion shaft 70. And this drive pinion shaft 70 is supported rotatably via the bearing on the inner circumferential surface of the differential carrier 60. A lubricating oil is filled in a space partitioned in fluid-tight manner by the outside rotation member 10 and the inside rotation member 20. That is, this lubricating oil is interposed between the clutch plates of the main clutch 30.

The main clutch 30 is a wet multiple disk friction clutch. This main clutch 30 comprises a number of clutch plates (a main inside clutch plate 31 and a main outside clutch plate 32) made of iron. And the main clutch 30 is disposed on the inner circumferential side of the housing 11 and on the outer circumferential side of the inside rotation member 20.

Each of the main clutch plates 31 making up the main clutch 30 has the shape of a disk formed with the spline on the inner circumferential side. And the spline on the inner circumferential side of each main inside clutch plate 31 is fitted with the spline on the outer circumferential side of the inside rotation member 20. That is, each main inside clutch plate 31 is movable in the axial direction with respect to the inside rotation member 20, and restricted in the rotational direction. In the main inside clutch plate 31, a paper wet friction material, not shown, is pasted in a part sliding with the main outside clutch plate 32. The paper wet friction material may be formed by making a paper from a fiber base material such as wood pulp or aramid fiber and a filler including a friction modifier such as cashew dust and a bulking agent such calcium carbonate or diatomaceous earth, impregnating a resin bonding agent composed of thermo setting resin into the paper, and then heating and curing it by thermo-forming, for example.

Also, each of the main outside clutch plates 32 making up the main clutch 30 has the shape of a disk formed with the spline on the outer circumferential side. And the spline on the outer circumferential side of each main outside clutch plate 32 is fitted with the spline on the inner circumferential side of the housing 11. That is, each main outside clutch plate 32 is axially movable with respect to the housing 11, and regulated in the rotational direction.

And each main outside clutch plate 32 is disposed between each main inside clutch plate 31. That is, each main inside clutch plate 31 and each main outside clutch plate 32 are contacted with each other for frictional engagement or separated from each other to become in a free state. Accordingly, the main clutch 30 transfers a torque between the outside rotation member 10 and the inside rotation member 20 according to a frictional force between each main inside clutch plate 31 and each main outside clutch plate 32.

Herein, a lubricating oil filled in a space partitioned in fluid-tight manner by the outside rotation member 10 and the inside rotation member 20 is interposed between each main inside clutch plate 31 and each main outside clutch plate 32. That is, a transfer torque between the outside rotation member 10 and the inside rotation member 20 can change depending on a viscosity of the lubricating oil, in addition to the frictional force between each main inside clutch plate 31 and each main outside clutch plate 32.

The pilot clutch mechanism 40 is disposed behind the main clutch 30 in the back of the vehicle. This pilot clutch mechanism 40 comprises a yoke 41, an electromagnet 42, an armature 43, and a pilot clutch 44. The yoke 41 is like a disk, and fixed to the differential carrier 60, as will be described later. The inner circumferential side of this yoke 41 is rotatably supported via a bearing on the outer circumferential surface of the inner cylindrical portion 12a of the rear cover 12. The electromagnet 42 is like an annulus with the electromagnetic coil wound and fixed to the front side of the yoke 41. And the electromagnet 42 is disposed in an annular concave portion 12d. This electromagnet 42 changes an engagement force of the main clutch 30 depending on an energizing current supplied by a controller 100 as will be described later.

The armature 43 is made of iron of magnetic material and like a disk formed with the spline on the outer circumferential side. This armature 43 is disposed in the back side of the main clutch 30 in the vehicle and in the front side of the disk part 12c of the rear cover 12 in the vehicle. And the spline on the outer circumferential side of the armature 43 is fitted with the spline on the inner circumferential side of the housing 11. That is, the armature 43 is axially movable with respect to the housing 11, and regulated in the rotation direction.

The pilot clutch 44 is a wet multiple disk friction clutch. This pilot clutch 44 comprises a number of clutch plates (a pilot inside clutch plate 441 and a pilot outside clutch plate 442) made of iron. This pilot clutch 44 is disposed on the inner circumferential side of the housing 11 and between the disk part 12c of the rear cover 12 and the armature 43.

Each of the pilot inside clutch plates 441 making up the pilot clutch 44 is like a disk formed with the spline on the inner circumferential side. And the spline on the inner circumferential side of each pilot inside clutch plate 441 is fitted with the spline on the outer circumferential side of a first cam member 51 for the cam mechanism 50, as will be described later. That is, each pilot inside clutch plate 441 is axially movable with respect to the first cam member 51 for the cam mechanism 50, and regulated in the rotation direction.

Also, each of the pilot outside clutch plates 442 making up the pilot clutch 44 is like a disk formed with the spline on the outer circumferential side. And the spline on the inner circumferential side of each pilot outside clutch plate 442 is fitted with the spline on the inner circumferential side of the housing 11. That is, each pilot outside clutch plate 442 is axially movable with respect to the housing 11, and regulated in the rotation direction.

And each pilot outside clutch plate 442 is disposed between each pilot inside clutch plate 441. That is, each pilot inside clutch plate 441 and each pilot outside clutch plate 442 are contacted with each other for frictional engagement or separated from each other to become in a free state. A lubricating oil is interposed between each pilot inside clutch plate 441 and each pilot outside clutch plate 442.

The cam mechanism 50 comprises a first cam member 51, a second cam member 52 and a cam follower 53. The first cam member 51 is like a disk formed with the spline on the outer circumferential side. A cam groove (not shown) is formed on the surface of this first cam member 51 in the front side of the vehicle. And the first cam member 51 is fitted rotatably with the outer circumferential surface of the inside rotation member 20, and rotatably borne on the rear cover 12. Further, the spline on the outer circumferential side of the first cam member 51 is fitted with the spline of the pilot inside clutch plate 441. That is, the first cam member 51 supports the pilot inside clutch plate 441 to be axially movable, and regulates it in the rotation direction.

The second cam member 52 is like a disk formed with the spline on the inner circumferential side. A cam groove (not shown) is formed on the surface of this second cam member 52 in the back side of the vehicle. And the spline of the second cam member 52 is fitted with the spline on the outer circumferential surface of the inside rotation member 20. That is, the second cam member 52 is axially movable with respect to the inside rotation member 20, and regulated in the rotation direction. And the surface of the second cam member 52 in the front side of the vehicle is opposed to the surface of the main inside clutch plates 31 making up the main clutch 30 in the back side of the vehicle.

And the cam follower 53 like a ball is interposed in the opposed cam grooves of the first cam member 51 and the second cam member 52. That is, when there occurs a relative rotation between the first cam member 51 and the second cam member 52 due to an action of the cam follower 53 and respective cam grooves, the first cam member 51 and the second cam member 52 are moved in the axial direction separating apart from each other.

The controller 100 calculates a transfer torque command value according to a running state of the vehicle, and supplies a current obtained based on this transfer torque command value to the electromagnetic coil of the electromagnet 42. The details of the controller 100 will be described later.

(3) Operation of Driving Force Transmission Device 1

The operation of the driving force transmission device 1 with the above constitution will be described below. In the following, an instance where the electromagnetic coil of the electromagnet 42 making up the pilot clutch mechanism 40 is energized and an instance where it is not energized will be described.

First of all, an instance where the electromagnetic coil of the electromagnet 42 is energized is given below. The outside rotation member 10 constituting the driving force transmission device 1, which is connected to the propeller shaft 80, is rotated along with the propeller shaft 80. And the pilot clutch mechanism 40 is formed with a loop-like circulating magnetic path that circulates through the yoke 41, the rear cover 12, each clutch plate 441, 442 of the pilot clutch 44 and the armature 43 from the electromagnet 42 as a point of origin if the electromagnetic coil of the electromagnet 42 is energized.

In this way, since the circulating magnetic path is formed, the armature 43 is attracted to the side of the electromagnet 42, or the side of the rear cover 12. As a result, the armature 43 presses the pilot clutch 44 so that the pilot inside clutch plate 441 and the pilot outside clutch plate 442 are contacted with each other and placed in a frictionally engaged state. Then, a rotation torque of the outside rotation member 10 regulated in rotation by the pilot outside clutch plates 442 is transferred via the pilot clutch 44 to the first cam member 51 regulated in rotation by the pilot inside clutch plates 441, so that the first cam member 51 is rotated.

If the first cam member 51 is rotated, the first cam member 51 and the second cam member 52 are relatively rotated, so that the second cam member 52 is moved with respect to the first cam member 51 toward the front side of the vehicle due to an action of the cam follower 53 and respective cam grooves. That is, the second cam member 52 is moved to the side of the main clutch 30 to press the main clutch 30 to the front side of the vehicle.

As a result, the main inside clutch plate 31 and the main outside clutch plate 32 are contacted with each other and placed in a frictionally engaged state. Then, a rotation torque of the outside rotation member 10 regulated in rotation by the main outside clutch plate 32 is transferred via the main clutch 30 to the inside rotation member 20 regulated in rotation by the main inside clutch plate 31, so that the inside rotation member 20 is rotated. And the rotation of the inside rotation member 20 is transferred to the drive pinion shaft 70 connected to the inside rotation member 20.

The controller 100 can control the amount of energizing current to the electromagnetic coil of the electromagnet 42 to control the frictionally engaged force of each clutch plate of the main clutch 30. That is, the controller 100 can control the amount of energizing current to the electromagnetic coil of the electromagnet 42 to control the rotation torque transferred to the drive pinion shaft 70 among the rotation torque of the propeller shaft 80.

Next, an instance where the electromagnetic coil of the electromagnet 42 is not energized is given below. In this case, the pilot clutch mechanism 40 is not formed with the circulating magnetic path. Accordingly, the pilot inside clutch plate 441 and the pilot outside clutch plate 442 are not engaged, and are relatively rotated. That is, the first cam member 51 regulated in rotation by the pilot inside clutch plates 441 and the outside rotation member 10 regulated in rotation by the pilot outside clutch plates 442 are relatively rotated.

Accordingly, there is no relative rotation between the first cam member 51 and the second cam member 52, whereby the axial positions of the first cam member 51 and the second cam member 52 are not changed. Therefore, the main inside clutch plate 31 and the main outside clutch plate 32 are not engaged, and are relatively rotated. Accordingly, the outside rotation member 10 regulated in rotation by the main outside clutch plate 32 and the inside rotation member 20 regulated in rotation by the main inside clutch plate 31 are relatively rotated. That is, the rotation torque of the propeller shaft 80 is not transferred to the drive pinion shaft 70.

(4) Detailed Explanation of Controller 100

Figure 2:
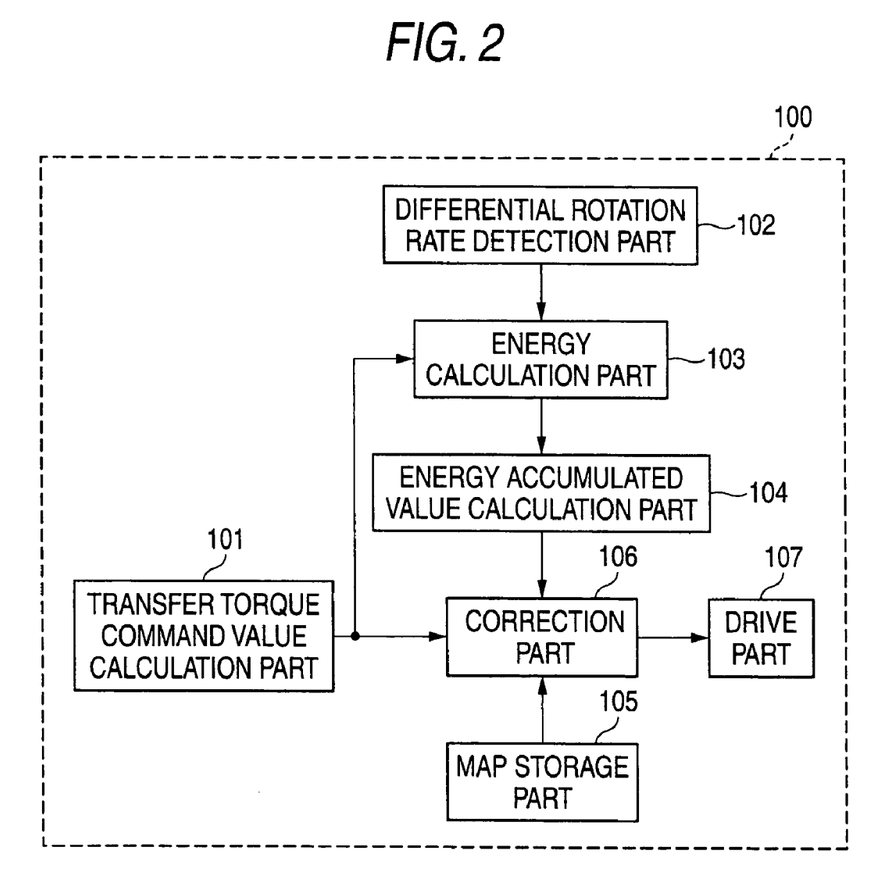
FIG. 2 is a block diagram showing the control device 100.
Figure 3:
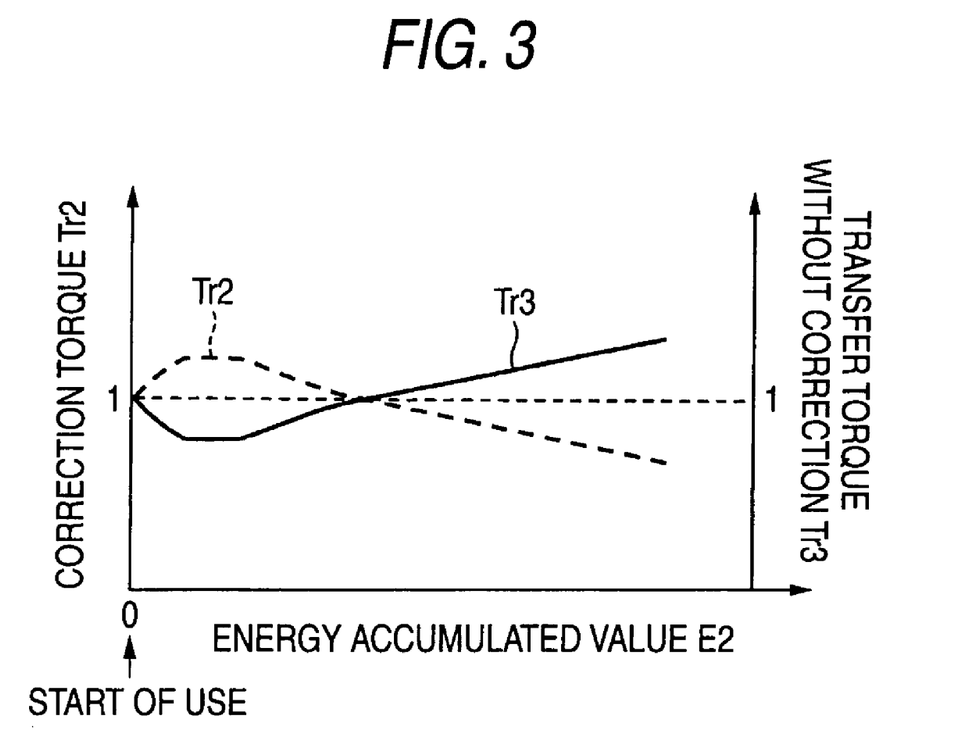
FIG. 3 is a graph showing the relationship between energy accumulated value E2 without correction and transfer torque Tr3, as well as explaining a map defining the relationship between energy accumulated value E2 and correction torque Tr2.

Referring to FIGS. 2 and 3, the controller 100 will be described below in detail. FIG. 2 is a detailed block diagram showing the control device 100. FIG. 3 is a graph showing the relationship between energy accumulated value E2 and transfer torque Tr3 where the transfer torque command value Tr1 is not corrected by a correction part 106 as will be described later, as well as explaining a map defining the relationship between energy accumulated value E2 and correction torque Tr2.

The controller 100 calculates a transfer torque command value according to a running state of the vehicle and supplies a current obtained based on this transfer torque command value to the electromagnetic coil of the electromagnet 42, as described above. And the controller 100 controls the transfer torque of the outside rotation member 10 and the inside rotation member 20. This controller 100 comprises a transfer torque command value calculation part 101, a differential rotation rate detection part 102, an energy calculation part 103, an energy accumulated value calculation part 104, a map storage part 105, a correction part 106 and a drive part 107, as shown in FIG. 2.

The transfer torque command value calculation part 101 calculates a transfer torque command value Tr1 that is the command value of transfer torque between the outside rotation member 10 and the inside rotation member 20 based on the running state of the vehicle. In a two wheel drive mode, the transfer torque command value Tr1 is 0, because the transfer torque from the outside rotation member 10 to the inside rotation member 20 is 0%. Also, in a four wheel drive mode in which a LOCK state occurs, the transfer torque command value Tr1 becomes the maximum value, because the transfer torque reaches 100%. And in the four wheel drive mode in which the transfer torque ranges from 0% to 100%, the transfer torque command value Tr1 is obtained according to the transfer torque.

The differential rotation rate detection part 102 detects a differential rotation rate N that is the difference between the rotation rate of the outside rotation member 10 and the rotation rate of the inside rotation member 20 per unit time. More specifically, the difference between both is calculated using an output value from a revolution sensor mounted on the outside rotation member 10 and an output value from a revolution sensor mounted on the inside rotation member 20.

The energy calculation part 103 calculates the energy value E1 ($E1=Tr1 \times N$), which is the transfer torque command value Tr1 calculated by the transfer torque command value calculation part 101 multiplied by the differential rotation rate N detected by the differential rotation rate detection part 102 at every predetermined sampling time t.

The energy accumulated value calculation part 104 calculates the energy accumulated value E2 of accumulating the energy value E1 calculated at every predetermined sample time t. That is, the energy accumulated value E2 is the value of accumulating the energy value E1 continually from the start of using the driving force transmission device 1.

The map storage part 105 stores beforehand a map defining the relationship between the energy accumulated value E2 and the correction torque Tr2. Referring to FIG. 3, this map will be described below. In FIG. 3, the transfer torque Tr3 which is not corrected by the correction part 106 is represented by the solid line, and the correction torque Tr2 is represented by the broken line. Also, the transfer torque at the start of use is indicated as 1, and the energy accumulated values E2 at the right end of the solid line representing Tr2 and at the right end of the broken line representing Tr3 correspond to the energy accumulated values at the time beyond the normal life of the vehicle.

The transfer torque Tr3 is slightly smaller than the energy accumulated value E2 for a short period after the start of using the driving force transmission device 1 based on the transfer torque command value Tr1, as represented by the solid line in FIG. 3. This may be caused because the paper wet friction material is compressed to reduce the thickness or the surface property of the friction material is changed to reduce the friction factor. Thereafter, the driving force transmission device 1 is used continually, whereby the transfer torque Tr3 is greater as the energy accumulated value E2 increases. Further, if the energy accumulated value E2 increases, the transfer torque Tr3 thereafter increases beyond the transfer torque Tr3 at the start of use. This is because there are less minute irregularities due to abrasion on the friction sliding surface between the pilot inside clutch plate 441 and the pilot outside clutch plate 442 to decrease the magnetic resistance of the circulating magnetic path and increase the force for pressing both clutch plates together.

On the other hand, the correction torque Tr2 is linear symmetry of the transfer torque Tr3 without correction as represented by the solid line around the transfer torque "1", as represented by the broken line of FIG. 3. That is, the correction torque Tr2 is the inverse of the transfer torque Tr3. More specifically, the correction torque Tr2 is slightly greater as the energy accumulated value E2 increases from 0. Thereafter, the correction torque Tr2 is smaller as the energy accumulated value E2 increases. Further, if the energy accumulated value E2 increases, the correction torque Tr2 falls below the transfer torque Tr2 where the energy accumulated value E2 is 0, and declines thereafter.

The correction part 106 acquires the correction torque Tr2 by applying the energy accumulated value E2 calculated by the energy accumulated value calculation part 104 to the map stored in the map storage part 105. And the correction part 106 corrects the transfer torque command value Tr1 calculated by the transfer torque command value calculation part 101 based on the acquired correction torque Tr2. More specifically, the correction part 106 corrects the transfer torque command value Tr1 by adding the correction torque Tr2 to calculate the corrected command value Tr4.

The drive part 107 supplies the current calculated based on the corrected command value Tr4 calculated by the correction part 106 to the electromagnet 42.

Herein, since the correction torque Tr2 has the relationship as shown in FIG. 3, when the current is supplied to the electromagnet 42 based on the corrected command value Tr4, the state of "1" can be always kept, even if the energy accumulated value E2 increases. In other words, the transfer torque between the outside rotation member 10 and the inside rotation member 20 can be obtained without influence due to a change with the passage of time.

Second Embodiment

Figure 4:
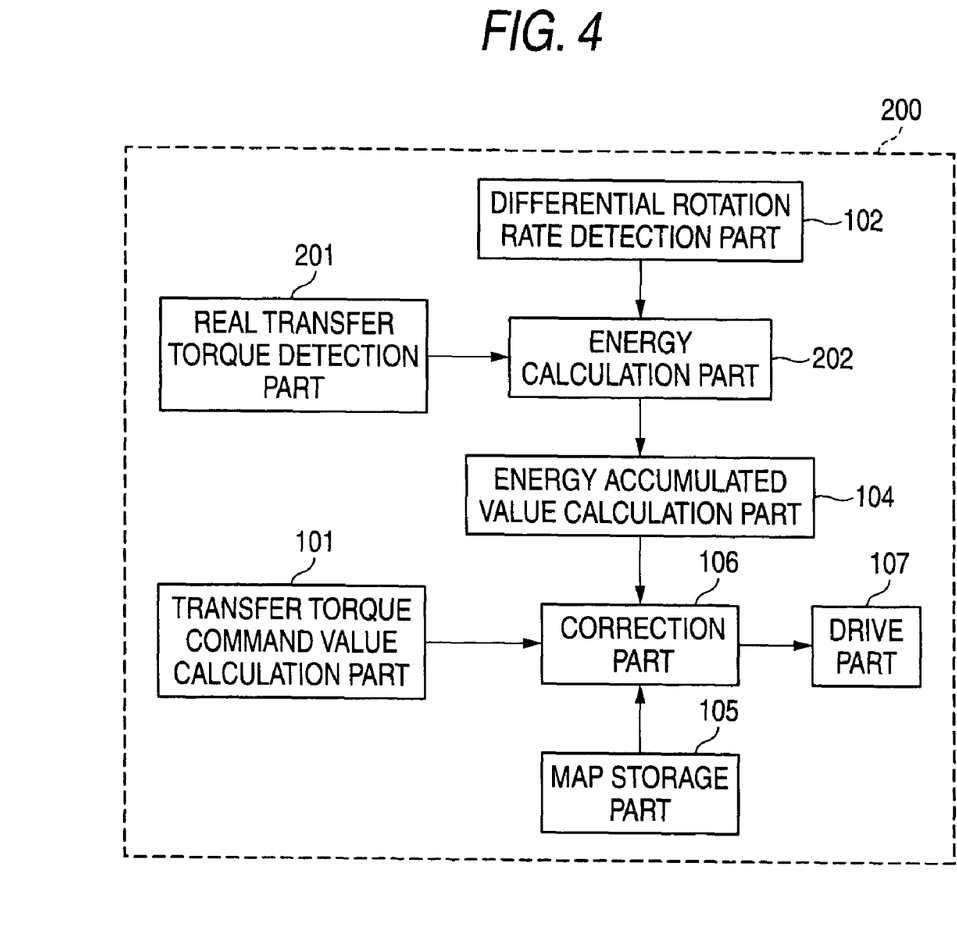
FIG. 4 is a block diagram showing the control device 200.

A driving force transmission device 1 according to a second embodiment will be described below. The driving force transmission device 1 of the second embodiment is different from the driving force transmission device 1 of the first embodiment in a controller 200 only. Referring to FIG. 4, the controller 200 will be described below. FIG. 4 is a detailed block diagram of the control device 200. Also, in the controller 200, the same parts are designated by the same reference numerals as the controller 100 of the first embodiment, and the explanation of the same parts is omitted.

The controller 200 comprises a transfer torque command value calculation part 101, a differential rotation rate detection part 102, a real transfer torque detection part 201, an energy calculation part 202, an energy accumulated value calculation part 104, a map storage part 105, a correction part 106 and a drive part 107, as shown in FIG. 4.

The real transfer torque detection part 201 detects an actual transfer torque (hereinafter referred to as a "real transfer torque") Tr5 from the outside rotation member 10 to the inside rotation member 20. This real transfer torque detection part 201 detects the torque using a torque sensor, for example.

The energy calculation part 202 calculates the energy value E1 (E1=Tr5×N), which is the real transfer torque Tr5 detected by the real transfer torque detection part 201 multiplied by the differential rotation rate N detected by the differential rotation rate detection part 102 at every predetermined sampling time t.

That is, though the energy calculation part 103 in the controller 100 of the first embodiment calculates the energy value E1 using the transfer torque command value Tr1, the energy calculation part 202 in the controller 200 of the second embodiment calculates the energy value E1 using the real transfer torque Tr5 detected by the real transfer torque detection part 201.

In this way, since the energy value E1 is calculated using the real transfer torque Tr5 and the energy accumulated value E2 is calculated using this energy value E1, the more accurate energy accumulated value E2 can be obtained. And since the correction torque Tr2 is calculated using this energy accumulated value E2, it is possible to prevent influence of change in the transfer torque due to a change with the passage of time at higher precision.

Third Embodiment

Figure 5:
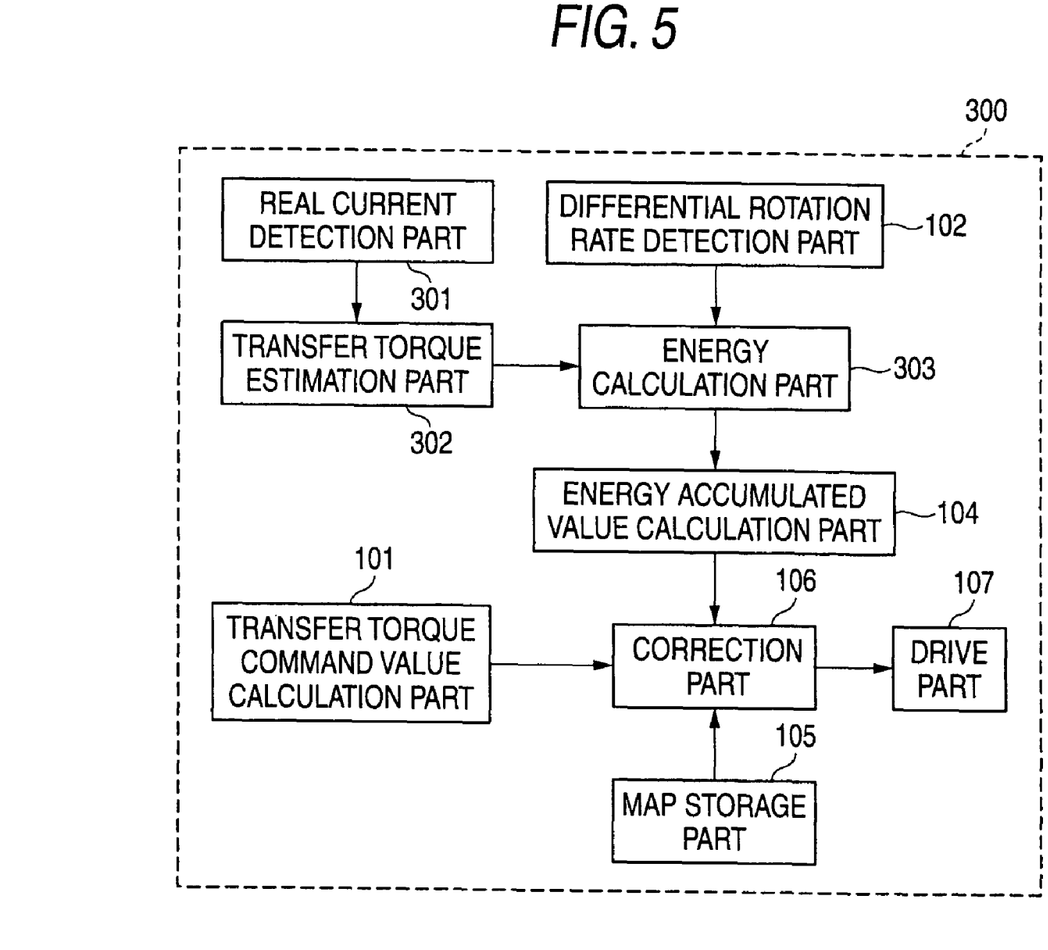
FIG. 5 is a block diagram showing the control device 300.

A driving force transmission device 1 according to a third embodiment will be described below. The driving force transmission device 1 of the third embodiment is different from the driving force transmission device 1 of the first embodiment in a controller 300 only. Referring to FIG. 5, the controller 200 will be described below. FIG. 5 is a detailed block diagram of the control device 300. Also, in the controller 300, the same parts are designated by the same reference numerals as the controller 100 of the first embodiment, and the explanation of the same parts is omitted.

The controller 300 comprises a transfer torque command value calculation part 101, a differential rotation rate detection part 102, a real current detection part 301, a transfer torque estimation part 302, an energy calculation part 303, an energy accumulated value calculation part 104, a map storage part 105, a correction part 106 and a drive part 107, as shown in FIG. 5.

The real current detection part 301 detects an actual current supplied to the electromagnet 42. This real current detection part 301 detects the current, using a current sensor, for example. The transfer torque estimation part 302 estimates (calculates) a transfer torque Tr6 (hereinafter referred to as an "estimated transfer torque") from the outside rotation member 10 to the inside rotation member 20, based on a real current detected by the real current detection part 301.

Herein, the relationship between the current supplied to the electromagnet 42 and the actual transfer torque changes with the temperature. Thus, the estimated transfer torque Tr6 is calculated in consideration of the temperature in addition to the current supplied to the electromagnet 42.

The energy calculation part 303 calculates the energy value E1 (E1=Tr6×N), which is the estimated transfer torque Tr6 estimated by the transfer torque estimation part 302 multiplied by the differential rotation rate N detected by the differential rotation rate detection part 102 at every predetermined sampling time t.

That is, though the energy calculation part 103 in the controller 100 of the first embodiment calculates the energy value E1 using the transfer torque command value Tr1, the energy calculation part 303 in the controller 300 of the third embodiment calculates the energy value E1 using the estimated transfer torque Tr6 estimated by the transfer torque estimation part 302.

In this way, since the energy value E1 is calculated using the estimated transfer torque Tr6 and the energy accumulated value E2 is calculated using this energy value E1, the more accurate energy accumulated value E2 can be obtained. And since the correction torque Tr2 is calculated using this energy accumulated value E2, it is possible to prevent influence of change in the transfer torque due to a change with the passage of time at higher precision. Also, the detection of current supplied to the electromagnet 42 is relatively easier than the detection of the real transfer torque Tr5 in the second embodiment. Accordingly, the estimated transfer torque Tr6 can be easily calculated using the current.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-266185 filed on Oct. 12, 2007, the contents of which are incorporated herein for reference.

What is claimed is:

1. A driving force transmission device, provided between two members arranged to be relatively rotatable and transferring a rotation driving force of a drive source for a vehicle to a wheel, capable of controlling a transfer torque between the two members, the driving force transmission device comprising:
   a controller including
      a transfer torque command value calculation section which calculates a transfer torque command value indicating a command value of the transfer torque between the two members based on a running state of the vehicle;
      an energy calculation section which calculates an energy value obtained by multiplying the transfer torque between the two members by a differential rotation rate between the two members at every predetermined sampling time;
      an energy accumulated value calculation section which calculates an energy accumulated value of accumulating the energy value calculated at every predetermined sampling time;
      a map storage section which stores a map defining a relationship between the energy accumulated value and a correction torque; and
      a correction section which acquires the correction torque by applying the energy accumulated value calculated by the energy accumulated value calculation section to the map and corrects the transfer torque command value calculated by the transfer torque command value calculation section based on the acquired correction torque.

2. The driving force transmission device according to claim 1, wherein the energy value calculated by the energy calculation section is obtained by multiplying the transfer torque command value calculated by the transfer torque command value calculation section by the differential rotation rate between the two members.

3. The driving force transmission device according to claim 1, wherein the energy value calculated by the energy calculation section is obtained by multiplying an actual transfer torque between the two members by the differential rotation rate between the two members.

4. The driving force transmission device according to claim 3, wherein the controller further includes a real transfer torque detection section which detects the actual transfer torque between the two members.

5. The driving force transmission device according to claim 1, further comprising:
   an electromagnet which controls the transfer torque between the two members based on a supplied current,
   wherein the energy value calculated by the energy calculation section is obtained by multiplying the transfer torque between the two members calculated based on an actual current supplied to the electromagnet by the differential rotation rate between the two members.

6. The driving force transmission device according to claim 5, wherein the controller further includes a drive section which supplies the current.

7. The driving force transmission device according to claim 1, wherein the controller further includes a differential rotation rate detection section which detects the differential rotation rate between the two members.

8. The driving force transmission device according to claim 5, wherein the controller further includes a real current detection section which detects the actual current supplied to the electromagnet.

* * * * *